UNITED STATES PATENT OFFICE.

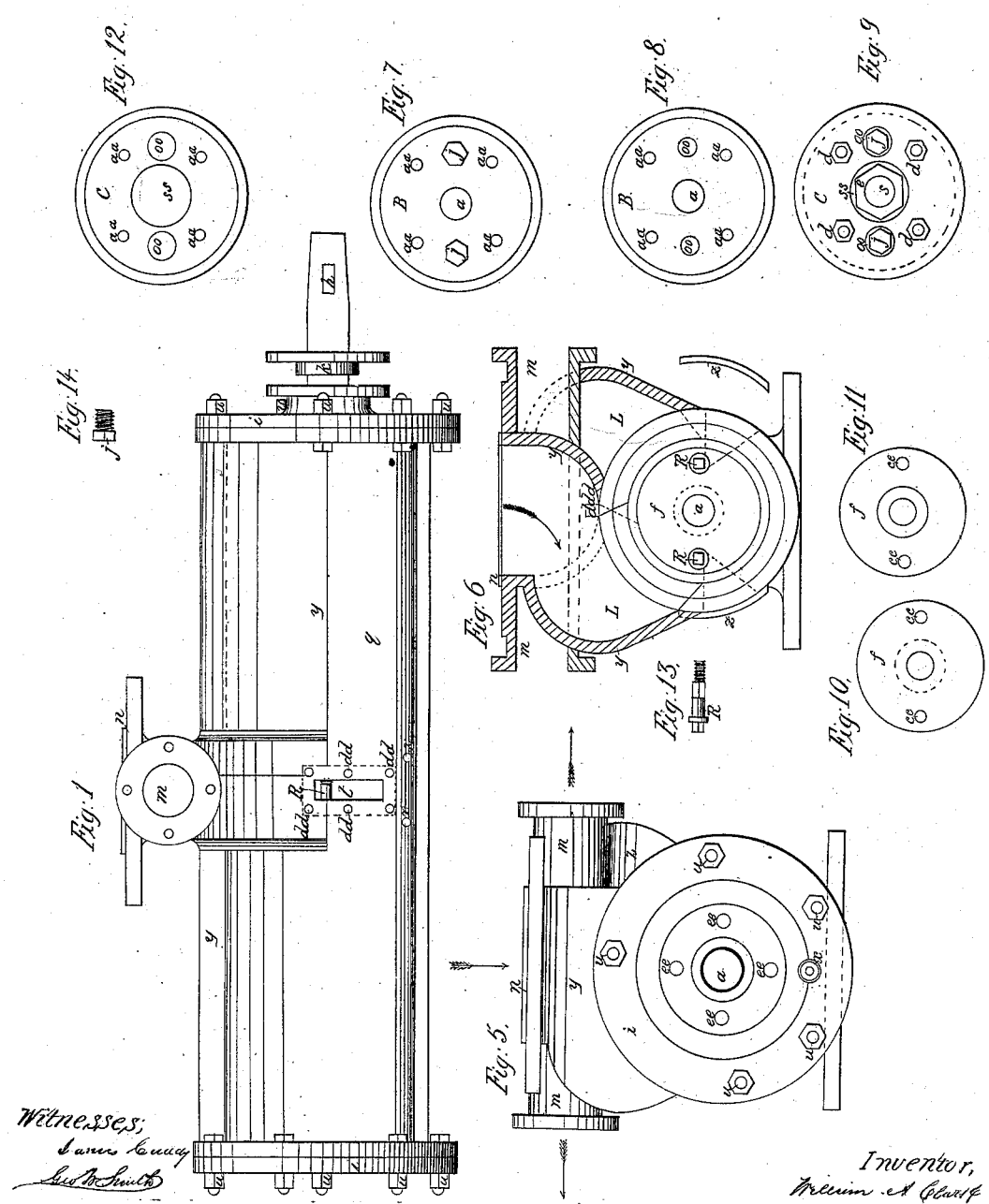

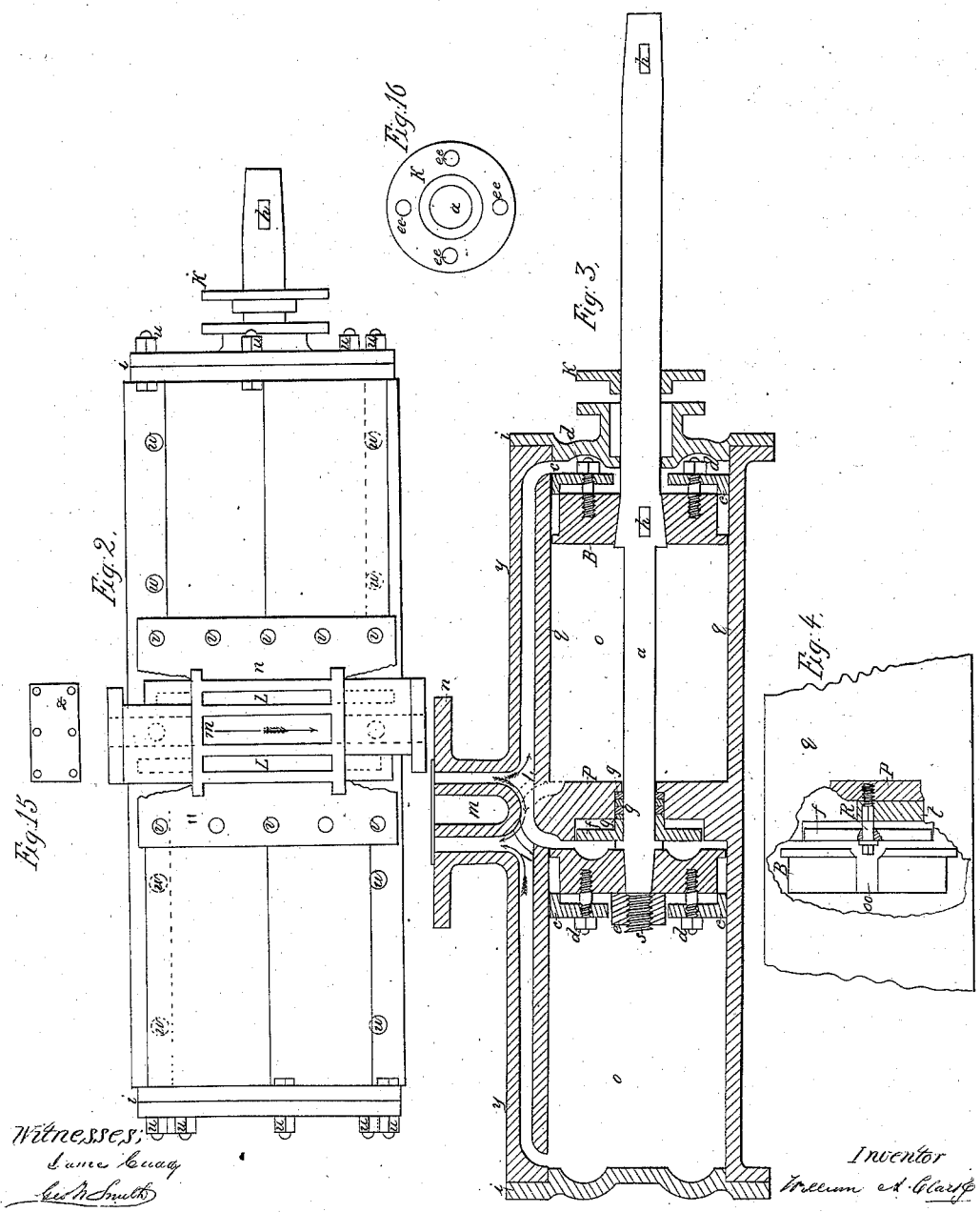

WILLIAM A. CLARK, OF ST. LOUIS, MISSOURI.

IMPROVEMENT IN STEAM-ENGINES.

Specification forming part of Letters Patent No. 15,685, dated September 9, 1856.

*To all whom it may concern:*

Be it known that I, WILLIAM A. CLARK, of St. Louis, in the county of St. Louis and State of Missouri, have invented a new and useful Compound Steam-Engine; and I do hereby declare that the following is a full, clear, and exact description of the construction and operation of the same, reference being had to the annexed drawings, making part of this specification, in which—

Figure 1 is a side elevation of the cylinder. Fig. 2 is a plan of the same. Fig. 3 is a longitudinal section of the same. Fig. 4 is a side section of the dividing-bridge between the chambers. Fig. 5 is an end view of cylinder. Fig. 6 is a transverse section at bridge.

The like letters refer to the like parts.

A is a compound piston-rod.

B is the piston-heads.

C is the followers.

$d$ is the follower-bolts; $e$, the nut fastening on the piston-head B in outer chamber.

$f$ is the stuffing-box gland or follower on the rod A, located at the center bridge.

$g\ g\ g\ g$ are the packing-rings in the center of stuffing-box.

$h$ is the key-holes for fastening on the rear head, B, and cross-head on end of piston-rod A.

$i$ is the cylinder-heads.

$j$ is the plug bolts or stops located in head B.

K is the outer stuffing-box gland; L, the openings or steam-ports to the chambers.

$m$ is the exhaust openings or ports; $n$, the steam-chest seat or flange; O, the compound chambers in the cylinder.

P is the dividing-bridge.

$q$ is the body of the cylinder.

R is the bolts fastening gland $f$ in the center bridge; S, the screw on the end of the rod A.

$t\ t$ are the pockets in the sides of the cylinder for access to the gland-bolts R, for operating the same while the engine is under way.

$u\ u$ are the cylinder-head bolts.

$v\ v$ are the holes for attaching the steam-chest; $w$, the holes in the bottom flange of the cylinder for fastening same to bed-plates.

$x\ x$ are the drainage-holes for cylinder-cocks; $y$, the side pipes, in which the passages or openings L are located.

Z is the cap or bonnet for the pockets $t$ in the sides of the cylinder.

Fig. 7 is a plan of the piston-head B, with stop-bolts $j$ in their position. $a\ a$ are the follower bolt-holes.

Fig. 8 is a plan of the piston-head B with stops out, representing the openings O O, through which the wrench passes to screw R for tightening gland $f$. Fig. 9 is an end view of head B and follower C, attached to its position, $s\ s$ being the openings in the follower, forming a pocket for nut $e$ on the rod A. Fig. 10 is the plan of the inner gland, $f$, $c\ c$ being the holes in which bolts R pass to attach to bridge P. Fig. 11 is the plan of reverse side $ff$. Fig. 12 is a plan of the follower C; $a\ a$, the holes for the follower-bolts $d$; $o\ o$, the corresponding openings for access to stops $j$ in head B; Fig. 13, plan of bolt R; Fig. 14, plan of stop-bolts $j$. Fig. 15 is a plan of the cap Z, located on the sides of the cylinder at pocket $t$. Fig. 16 is a plan of the outer gland, K. Fig. 17 is a side view of cap Z.

$d\ d\ d$ in Fig. 6 represent a dividing-bridge passing under the exhaust $m$, separating the ports L in their oblique position.

$d\ d$ are the bolt-holes for fastening down the cap Z to the pocket $t$.

I construct my compound engine with two or more chambers in the cylinder, with a corresponding number of piston-heads and divisions or bridges cast with the cylinder or separately attached to the inside of the cylinder. In those bridges I locate the inner stuffing-boxes for the purpose of keeping the communication between the chambers steam-tight by the use of rings $g\ g\ g\ g$, and the gland $f$ in connection with bolts R, it being tapped into the bridge P, the bolts R being accessible through the head B by unscrewing the stop-bolt $j$ in head B, opening a passage for a wrench to the head of the gland-bolt R, tightening the gland at pleasure without removing the piston-head B or follower C, it having a corresponding opening, as shown in Fig. 12 at $o\ o$; or remove the side caps and the bolt R is accessible through the pocket $t$ for the same purpose of tightening the gland $f$ during the operation of the engine.

The valve-seat and valve I construct in usual form, but using the slide-valve in this case with a side pipe or conducting-passage from head to head of chambers with corresponding openings into the chambers at each end, passing the bridges and each other obliquely under the exhaust-port *m*, as denoted by arrows in Fig. 3, letter L. The valve, being thrown forward, receives steam through the side pipe, Y, by the passage L, passing, respectively, to the compound chambers, acting on two or more heads at the same time from the same port and passage, thereby transmitting the pressure or power of two or more heads on one rod to the crank or point of action relatively, exhausting in like manner through the same passage under the valve in its back motion into the exhaust chamber or port *m*. Thus, with a single action of the valve, the steam is instantly injected into the chambers as in a single engine.

Having thus fully described my compound engine, what I claim as my invention, and desire to secure by Letters Patent, is—

The arrangement of two or more pistons on the one piston-rod within the one cylinder divided into compartments, the movement of each piston being limited to its respective compartment, and all the pistons traveling in the same direction, as herein set forth.

WILLIAM A. CLARK.

Witnesses:
 JAMES CUDDY,
 GEO. W. SMITH.